UNITED STATES PATENT OFFICE.

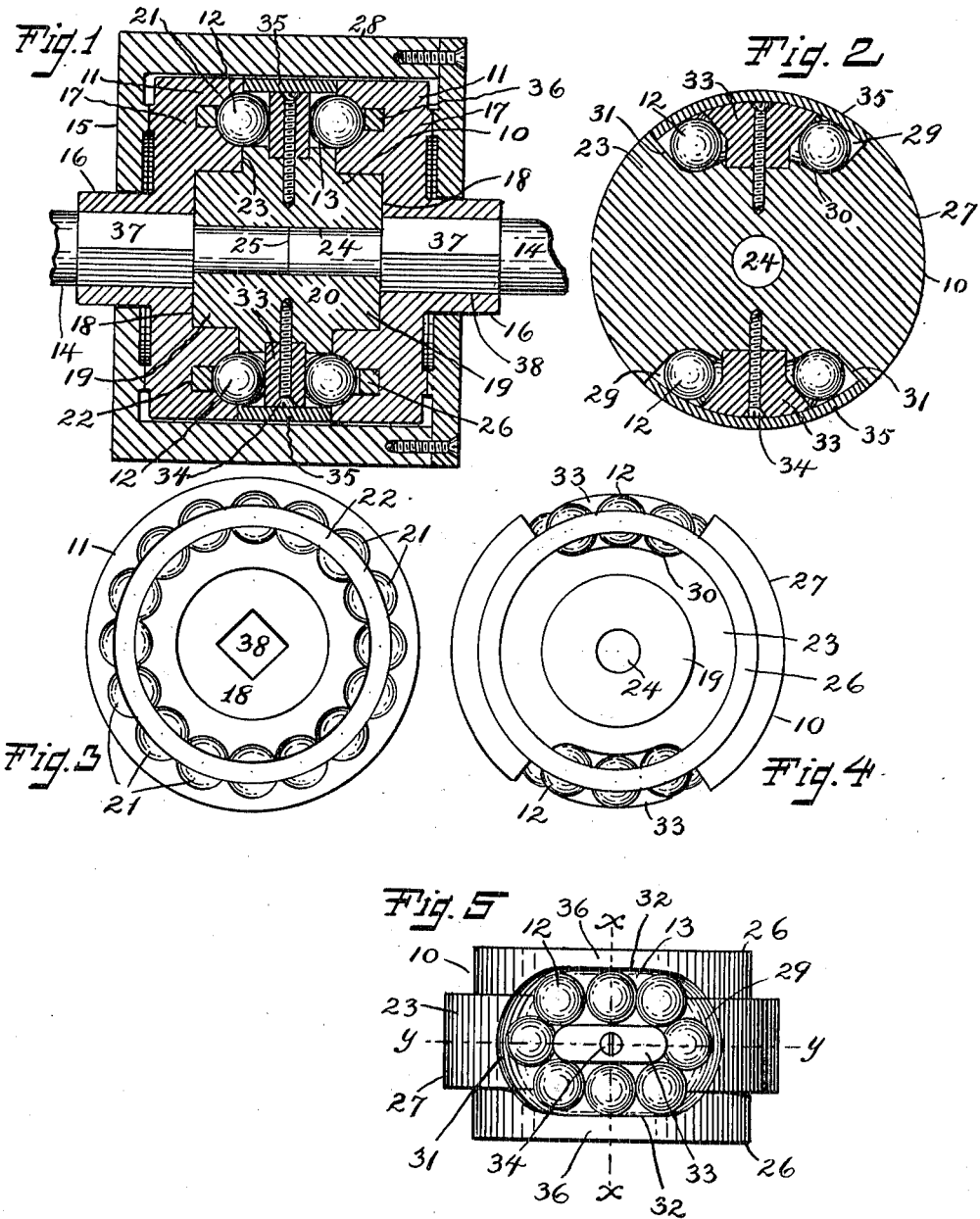

JOSEPH H. DEMING, OF MIDDLETOWN, CONNECTICUT, ASSIGNOR OF ONE-HALF TO OSCAR NELSON, OF MIDDLETOWN, CONNECTICUT.

DIFFERENTIAL COUPLING DEVICE.

1,096,830.  Specification of Letters Patent. Patented May 19, 1914.

Application filed March 14, 1913. Serial No. 754,265.

*To all whom it may concern:*

Be it known that I, JOSEPH H. DEMING, a citizen of the United States, residing at Middletown, in the county of Middlesex and State of Connecticut, have invented certain new and useful Improvements in Differential Coupling Devices, of which the following is a specification.

My invention relates to improvements in differential coupling devices, and the object of my improvement is to make more efficient the device shown and described in my application for Letters Patent Serial No. 724,058, filed October 5, 1912.

In the accompanying drawing:—Figure 1 is a sectional view of the complete device on the line $x\ x$ of Fig. 5. Fig. 2 is a similar view on the line $y—y$ of Fig. 5. Fig. 3 is an inner elevation of one of the end members. Fig. 4 is a similar view of the intermediate member. Fig. 5 is a plan view of the same.

My differential coupling device comprises an intermediate member 10 and a pair of end members 11, one on each side of the said intermediate member, and one or more sets of coupling devices comprising each a set of balls 12 in a raceway 13 on the said intermediate member 10. Each of the said end members 11 is connected with the end of a shaft 14 suitably supported in bearings not shown and the said members are held together in operative position by a housing 15. The end members 11 as shown are essentially similar and comprise each the hub portion 16 which receives the shaft 14 and a flange portion 17 at the inner end thereof. The said flange portion 17 as shown is provided with an axially positioned annular recess 18 on the inner face in which is operatively received the reduced end 19 of a hub portion 20 of the intermediate member 10. Exterior to the said recess 18 the said flange portion 17 is provided with a series of notches or seats 21 arranged in a circle and of semi-spherical formation, fitting the balls 12. The said notches 21 are interrupted at approximately the middle thereof by an annular groove 22 of appreciable less width than the said notches 21 and extending axially into the body of the flange portion 17 slightly beyond the axial depth of the said notches 21.

The intermediate member 10 comprises the hub portion 20 having at each end the reduced end or extension 19 and an annular body portion 23 intermediate the said ends or extensions 19, and the said hub portion 20 is provided with an axial bore 24 in which are received the cylindrical extreme ends 25 of the shafts 14, which as shown have their ends in abutment at the middle thereof. The end faces of the body portion 23 have each an axially extending flange-like annular tongue 26. In normal position the opposed faces of the body portion 23 and the flange portions 17 of the end members 11 are essentially in abutment, and the overhanging annular tongues 26 are housed in the annular recess 22 in the end faces of the end members 11. The outer periphery 27 of the intermediate member 10 is finished off cylindrically and is a fit for and suitable to receive the shell portion 28 of the housing 15. The said outer periphery 27 is provided at intervals with recesses 29, which extend for an appreciable distance in the axial plane and which extend axially into a portion of the overhanging annular tongue 26. The walls of the said recess 29 in each case constitute the bottom and the outer side walls of the raceway 13, the bottom 30 thereof constituting the bottom or tread of the said raceway 13, the end walls 31 constituting the end walls of the raceway and the lateral walls 32 constituting the lateral walls of the raceway 13. The interior side walls of the raceway 13 are formed by a centrally positioned plug 33 which is secured to the bottom of the recess 29 in any suitable manner, as by a screw 34, and which may be fitted to the said bottom with a dovetailed or overlapping joint as shown. The depth of the recess 29 is somewhat greater than the diameter of the balls 12, and the space between the top or outer end of the balls 12 when housed in the raceway 13 and the inner surface of the shell 28 of the housing 15 is filled by a top plate 35, which plate, as shown, extends also over the plug 33. The plate 35 serves as the top wall of the raceway 13.

The balls 12 when positioned in the raceway 13 essentially fill the same, and a plurality of them shown as three is exposed beyond and overhangs the outer face of the body portion 23 and is retained therein by the opposed retainer portion 36 of the tongue 26 which serves as a ball retainer, and the said exposed balls 12 are in registration with and engaged by the notches 21.

The portions 37 of the shafts 14 engaged with the hub portion 16 of the end members 11 are square and the holes 38 in the said hub portion 16 fit the said end members 11.

With the parts arranged as described, and as shown in Fig. 1, when rotary motion is given to one of the end members 11, the balls 12 are moved in the raceway 13, by the notches 21 if free to do so. In such case, by holding the middle member 10 stationary, a rotary movement is imparted to the other end member 11 through the medium of the balls 12, and in a direction reverse to the direction of movement or rotation of the first end member 11, the movements of the shafts 14 corresponding in each case to that of the end member 11 mounted thereon, the end member and shaft in each case constituting a unitary structure. In case the intermediate member 10 is given a rotary movement when the resistance is equal on the end members 11 the balls 12 engage with the notches 21 coöperate therewith virtually like interlocked gear teeth and serve to couple the intermediate member 10 and the end members 11 positively so as to effect a positive and equal drive to the said end members 11. In case however there is unequal resistance on the two shaft ends 14 there results an unbalanced condition with respect to the balls 12 with the result that they will be propelled in their raceways 13 until a condition of equilibrium or balancing is attained, and the unbalanced condition mentioned results in a greater movement of one shaft 14 relatively to the other.

Certain differences in mechanical details are involved in the construction described over those shown and described in the previous application referred to. Other changes in details will be referred to below.

It will be noted that the raceway 13 is non-circular, being elongated, and essentially oval, with the major axis positioned in the central radial plane. This permits of a plurality of balls 12 being exposed to and engaged with a corresponding number of the notches 21, as shown the number being three. The side walls 32 are parallel for the greater part of the length until they meet the curved end walls 31. The extreme end portion of the end wall 31 is formed radial, as shown in Fig. 2. This feature we find to be advantageous under operating conditions. The base or tread portion 30 of the raceway 13 is curved, being concentric with the axis, the balls 12 that are engaged with the notches 21 traveling with the said notches in a circular path, and therefore freely engage with and disengage from the said notches as they travel in the raceway simultaneously with a relative movement of the end members and the intermediate member.

The novel features of construction described I find to contribute in large measure to successful practical operation of my differential coupling device.

I claim as my invention:—

1. A differential coupling device comprising a pair of end members and an intermediate member, and connecting means for connecting the said end members and supported by the said intermediate member comprising a set of balls in a raceway, having two side walls, one on each side thereof, and the said side wall on one side being parallel to the said side wall on the other side for an appreciable distance.

2. A differential coupling device comprising a pair of end members and an intermediate member, and connecting means for connecting the said end members and supported by the said intermediate member comprising a set of balls in a raceway, and the bottom tread of the said raceway being formed concentric with the axis of the said members.

3. A differential coupling device comprising a pair of end members and an intermediate member, and connecting means for connecting the said end members and supported by the said intermediate member comprising a set of balls in a raceway, the formation of the raceway being non-circular, and the bottom tread of the said raceway being formed concentric with the axis of the said members.

4. A differential coupling device comprising a pair of end members and an intermediate member, and connecting means for connecting the said end members and supported by the said intermediate member comprising a set of balls in a raceway, and the said raceway being appreciably elongated and approximately oval and with the major axis in the radial plane of the said intermediate member.

5. A differential coupling device comprising a pair of end members and an intermediate member, and connecting means for connecting the said end members and supported by the said intermediate member comprising a set of balls in a raceway, and the extreme end walls of the said raceway being formed substantially radial relatively to the axis of the said members.

6. A differential coupling device comprising a pair of end members and an intermediate member, and connecting means for connecting the said end members and supported by the said intermediate member comprising a set of balls in a raceway, the opposite side walls of the said raceway being parallel for an appreciable distance and the extreme end walls of the said raceway being formed substantially radial relatively to the axis of said members.

7. A differential coupling device comprising a pair of end members and an intermediate member, and connecting means for connecting the said end members and supported by the said intermediate member comprising a set of balls in a raceway, and the formation of the said raceway being non-circular, the said end members having notches that engage with the said balls, the said notches being arranged in a circle whose center is in the axis of the said members, and the number of said notches that are engaged with the said balls being not less than three.

JOSEPH H. DEMING.

Witnesses:
BERTRAND E. SPENCER,
OLYN A. BRAINARD.